July 24, 1923.
D. A. KRICK
1,462,969
COMBINATION TAIL LIGHT AND SIGNALING DEVICE
Filed Dec. 7, 1922    2 Sheets-Sheet 1
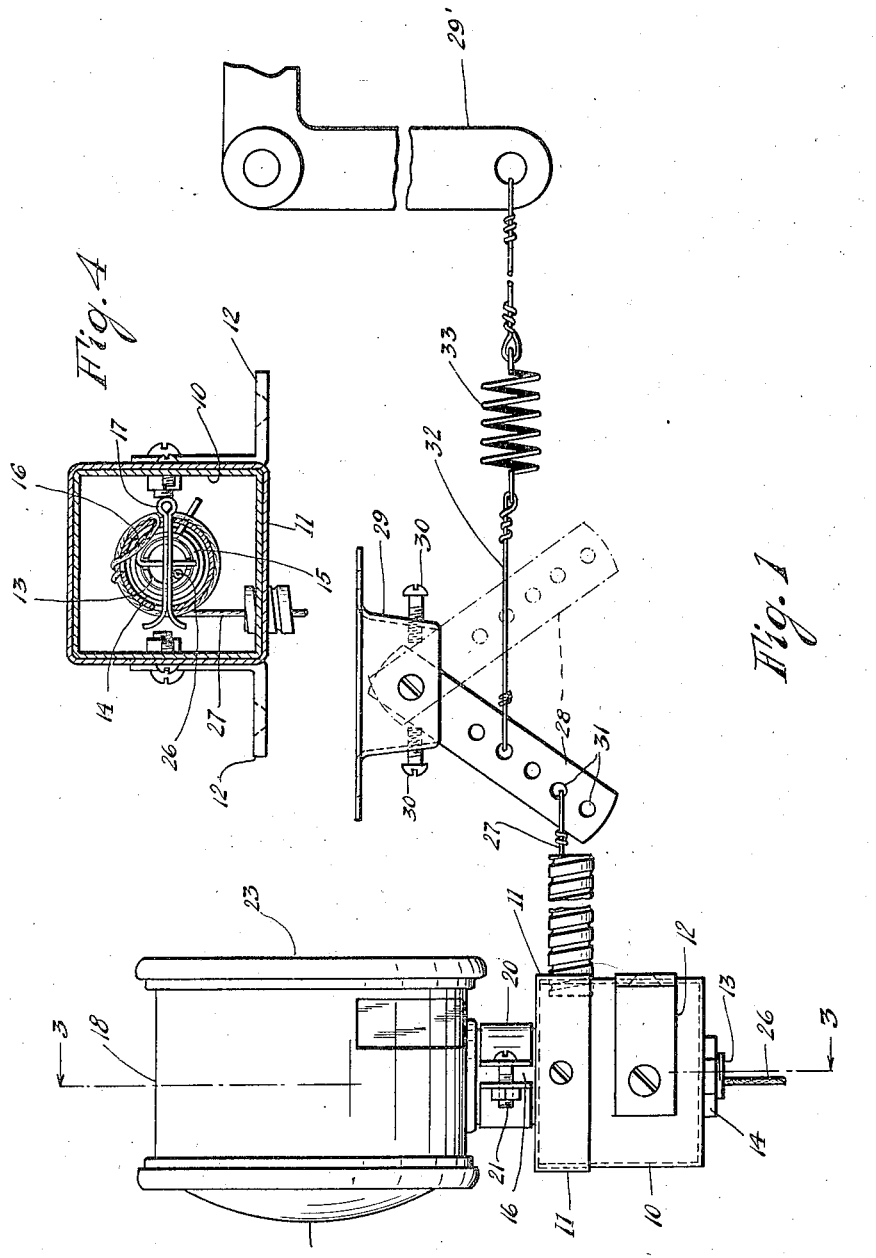
Witnesses:
Inventor:
Daniel A. Krick
By Joshua R. H. Potts
His Attorney July 24, 1923.

D. A. KRICK

COMBINATION TAIL LIGHT AND SIGNALING DEVICE

Filed Dec. 7, 1922  2 Sheets-Sheet 2

1,462,969

Witnesses:

Inventor:
Daniel A. Krick
By Joshua R. H. Potts
His Attorney

Patented July 24, 1923.

1,462,969

UNITED STATES PATENT OFFICE.

DANIEL A. KRICK, OF CHICAGO, ILLINOIS.

COMBINATION TAIL LIGHT AND SIGNALING DEVICE.

Application filed December 7, 1922. Serial No. 605,442.

*To all whom it may concern:*

Be it known that I, DANIEL A. KRICK, a citizen of the United States, and a resident of the city of Chicago, county of Cook, and State of Illinois, have invented certain new and useful Improvements in Combination Tail Lights and Signaling Devices, of which the following is a specification.

My invention relates to novel improvements in Combination Tail Lights and Signaling Devices and has for its principal object the provision of a swivelly mounted head actuated by the brake clutch of a vehicle with which the device is used whereupon by swiveling the head the stop signal is brought into view and upon swiveling in the reversed direction, the tail light is brought into view, the arrangement being such that by the construction to be hereinafter set forth a simple device will be provided for signaling drivers of other vehicles of the intention of the driver of the vehicle with which the device is associated.

Other objects will appear hereinafter.

The invention consists in the combinations and arrangements of parts hereinafter described and claimed.

The invention will be best understood by reference to the accompanying drawings forming a part of this specification, and in which, Fig. 1, is a side elevational view of a combination tail light and stop light embodied in the invention;

Fig. 4, is a sectional view taken substantially on line 4—4 of Fig. 2.

Figure 3:
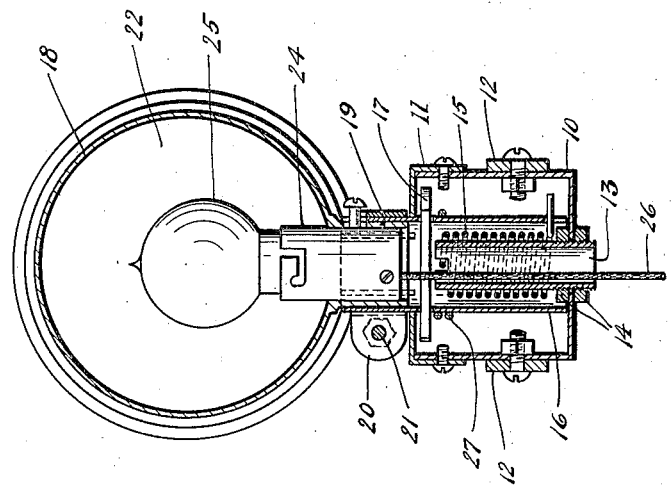
Fig. 3, is a sectional view taken substantially on line 3—3 of Fig. 1.
Figure 2:
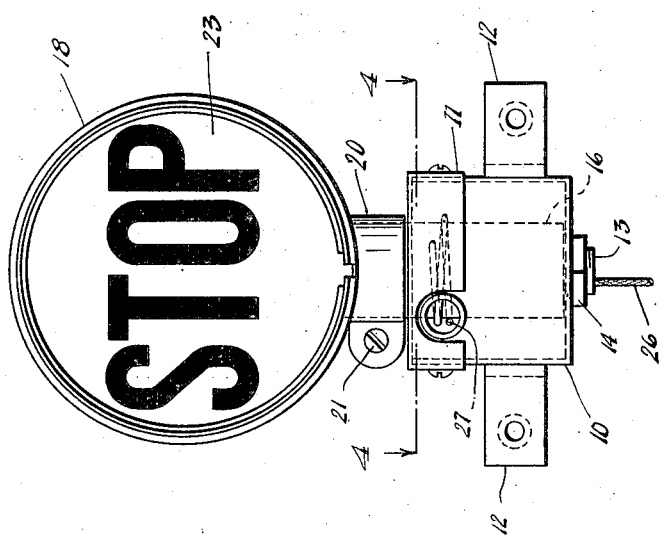
Fig. 2, is an elevational view of the same showing the stop light in view.

Referring to the drawings illustrating the preferred form of construction, 10 indicates a casing having a removable top wall 11 and provided with means 12 for attachment to a vehicle in a position which will best serve the purpose. Arranged in the casing 10 is a hollow post 13 extending upwardly from the bottom thereof and fixed thereto by a suitable nut 14. Having one end fixed to the post 13 and extending therearound is a spring member 15 having its opposite end fixed to a hollow support 16 arranged over the post 13 and projecting through the top wall 11 as illustrated. The support 16 is held in the position illustrated by a cotter pin 17, or the like, which engages the under surface of the wall 11 when in closed position, as illustrated. The support 16 carries a head 18 having a hollow boss 19 for engagement with said support. It will be noted in Fig. 3, that the upper end portion of the support 16 has a number of slits cut therein, the purpose being such that when a collar 20 is arranged therearound by tightening the bolt 21 carried by the collar the upper end portion of the support 16 will be drawn into tight engagement with the boss 19.

The drawings illustrate the head 18 as being detachably secured to the support 16 by collar 20, however, if it be desired for any reason the boss can be provided with screw threads and screw threaded into the outer end of the support, this arrangement being one of the many ways of removably carrying the head.

As illustrated, the front and rear walls of the head 18 are of translucid material which are in this instance in the form of removable glass plates 22 and 23, the plate 22 being of the usual glass now in commercial use for tail lights. The glass plate 23 bears the word "Stop" in heavy type as illustrated.

Arranged to be carried by the boss 19 is a socket 24 carrying an electric light bulb 25 connected in circuit with electric wires 26 leading to a suitable source of supply.

Fixed to the support 16, by suitable means, and coiled therearound, within the casing 10, is a Bowden wire 27 having its opposite end secured to a lever 28 pivotally carried by a member 29 and capable of adjustment by set screws 30, with reference to its pivotal movement. The lever is provided with a number of openings 31 affording means of adjusting the Bowden wire according to the pivotal movement of the lever. The member 29 is adapted to be fixed to the floor boards of a vehicle, with which the device is used, and is located a desirable distance relative to the brake clutch 29' thereof. Secured to the lever 28 is a flexible member 32 having an end fixed to a tension spring 33 which in turn is secured to the brake clutch as indicated.

The flexible member, as illustrated, is fixed to the lever 28, by passing the end through one of the openings 31, the arrangement being such that adjustment can be had according to the movement of the brake mechanism, as it has been found necessary under certain conditions to allow a short movement of the brake mechanism before the lever 28 is actuated.

The operation of the device is as follows:

Normally during the operation of a vehicle with which the device is used, the tail light is in position to be viewed by others. But when the brake clutch is brought into operation to either slow the vehicle down or stop the same, by movement of the brake clutch to accomplish this, the lever 28 is drawn in the direction of the movement of the brake clutch and in turn the lever draws the Bowden wire 27. The Bowden wire being wound around and fixed to the support 16, being drawn by the lever 28 in the direction of its movement causes the support to swivel. Upon swivel movement of the support 16, the head 18, due to the fact that the same is fixed thereto and movable therewith will also swivel, bringing the stop signal side of the head into view and the tail light out of view. Upon the swivel movement of the support 16 the spring member 15 is drawn around the post 13 and upon release of the brake clutch or rather upon movement of the brake clutch in the direction opposite that referred to above, the tension of the spring will be released and the head 18 will automatically swivel bringing the tail light again into view. When this takes place the tension spring 33, at the same time, draws the lever 28 back to its initial position.

The lever 28 due to the set screws 30 can be adjusted according to the distance the brake lever moves when actuated to slow down the vehicle or stop the same.

It will be apparent from the disclosure and description that I provide a combination tail light and signal light which can be manufactured at a small cost and which comprises elements simple in structure to perform the functions and purposes as is required of the device.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A device of the class described including a casing, a member within the casing and fixed thereto, a movable support within the casing and having a portion extending exterior thereof, a member surrounding the first named member and having one end attached thereto and having the opposite end attached to the support adapted to influence the movement of the support in one direction, means for moving the support in the opposite direction, and a signal head carried by the support and fixed to the exterior portion thereof.

2. A device of the class described including a casing, a member within the casing and fixed thereto, a movable support within the casing and having a portion extending exterior thereof, a member surrounding the first named member and having one end attached thereto and having the opposite end attached to the support adapted to influence the movement of the support in one direction, means for moving the support in the opposite direction, a signal head having an extension insertable within the support at the exterior end portion thereof, and means for securing the extension within the support.

3. A device of the class described including a casing having a removable top wall, a support within the casing and having a portion extending exterior thereof, a signal head having an extension insertable in the support, means for rotating said support in one direction, a member located within the support at the interior end thereof, and fixed to the casing, and a member surrounding the last named member and having one end attached thereto and having the opposite end attached to the support to influence the movement of the support in the opposite direction.

4. A device of the class described including a casing having a removable top wall, a support within the casing and having a portion extending exterior thereof and having slits formed in the exterior portion, means for rotating the support in one direction, means for rotating the support in the opposite direction, a signal head having an extended portion insertable in the support at the exterior end thereof, and a member embracing the exterior end of the support for securing the extension therein.

5. A device of the class described including a signal head mounted for swivel movement, a connection between the head and the brake clutch of a vehicle, and a lever incorporated in the connection and having adjustable means limiting the movement thereof.

6. A device of the class described including a signal head mounted for swivel movement, a connection between the head and the brake clutch of a vehicle for swiveling the head in one direction, means for swiveling the head in the opposite direction, and a lever incorporated in the connection and having means limiting the movement thereof.

7. A device of the class described including a signal head mounted for movement, a connection between the head and the brake clutch of a vehicle for moving the head in one direction, and means for moving the head in the opposite direction, a lever incorporated in the connection; means for adjusting the movement of the lever, and a resilient member incorporated in the connection between the lever and the brake clutch.

8. A device of the class described including a signal head mounted for movement, a connection between the head and the brake clutch of a vehicle for moving the head in one direction, means for moving the head in the opposite direction, and a lever incorporated in the connection and having means for adjusting the movement thereof.

9. A combination tail light and signaling device including in combination with the brake clutch of a vehicle, a casing having means of attachment to the vehicle, a post arranged in said casing and extending upwardly from the bottom thereof, a support arranged in said casing over said post and extending through the top wall of the casing and mounted for swivel movement thereon, a head having translucid front and rear walls, carried by said support and movable therewith, a lever carried by said vehicle and operatively connected to said support, a connection including a spring member connected to said lever and said brake clutch for swiveling said support in one direction upon movement of said clutch, and a spring member carried by said post connected thereto and to said support for swiveling said support in the opposite direction.

10. A combinatiton tail light and signaling device including in combination with the brake clutch of a vehicle, a casing having means of attachment to the vehicle, a post arranged in said casing and extending upwardly from the bottom thereof, a support arranged in said casing over said post and extending through the top wall of the casing and mounted for swivel movement thereon, a removable head having translucid front and rear walls, carried by said support and movable therewith, an adjustable lever carried by said vehicle and operatively connected to said support, a connection including a spring member connected to said lever and said brake clutch for swiveling said support in one direction upon movement of said clutch, and a spring member carried by said post connected thereto and to said support for swiveling said support in the opposite direction.

11. A combination tail light and signaling device including in combination with the brake clutch of a vehicle, a casing having means of attachment to the vehicle and having a removable top wall, a post arranged in said casing, a swivelly mounted support carried by said casing over said post and extending through the top wall thereof, a pin member traversing said support and engaging the under surface of said removable wall, a detachable head having translucid front and rear walls carried by said support and movable therewith, an adjustable lever pivotally carried by said vehicle, a connection between said lever and said support, a connection including a spring member between said lever and said brake clutch for swiveling said support and said head in one direction, and a spring member arranged in said casing connected to said post and said support for swiveling said support and said head in the opposite direction.

12. A device of the class described comprising in combination with the brake clutch of a vehicle, a combination tail light and signaling device carried by said vehicle and means operatively connecting said brake clutch with said tail light and signaling device, said means comprising a member attached to the floor board of said vehicle, a lever pivotally carried by said member and elements connected to said lever and said tail light and signaling device and said brake clutch, there being spaced openings formed in said lever affording means of adjusting said elements.

In testimony whereof I have signed my name to this specification in the presence of two subscribing witnesses.

DANIEL A. KRICK.

Witnesses:
FREDA C. APPLETON,
JOSHUA R. H. POTTS.